United States Patent
Chedore et al.

(10) Patent No.: US 10,630,417 B1
(45) Date of Patent: Apr. 21, 2020

(54) OPTIMIZED COLORLESS, DIRECTIONLESS, AND CONTENTIONLESS ROADM IN A MODULE

(71) Applicant: Ciena Corporation, Hanover, MD (US)

(72) Inventors: Paul Chedore, Ottawa (CA); Jean-Luc Archambault, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/161,165

(22) Filed: Oct. 16, 2018

(51) Int. Cl.
*H04J 14/00* (2006.01)
*H04J 14/02* (2006.01)
*H04Q 11/00* (2006.01)

(52) U.S. Cl.
CPC ...... *H04J 14/0212* (2013.01); *H04Q 11/0005* (2013.01); *H04Q 2011/0016* (2013.01)

(58) Field of Classification Search
CPC ............. H04J 14/0212; H04Q 11/0005; H04Q 2011/0016
USPC ...................................................... 398/48, 83
See application file for complete search history.

(56) References Cited

U.S. PATENT DOCUMENTS

2010/0150558 A1* 6/2010 Wisseman .......... H04J 14/0212 398/79

2011/0188853 A1* 8/2011 Schimpe ............. H04J 14/0208 398/38
2014/0139906 A1* 5/2014 Takeyama ........... H01S 3/06758 359/337.13

OTHER PUBLICATIONS

Paul D. Colbourne et al., Contentionless Twin 8×24 WSS with Low Insertion Loss, Mar. 15, 2018, pp. 1-3.

* cited by examiner

*Primary Examiner* — Mohammad R Sedighian
(74) *Attorney, Agent, or Firm* — Clements Bernard Walker Law; Christopher L. Bernard; Lawrence A. Baratta, Jr.

(57) ABSTRACT

A Reconfigurable Optical Add/Drop Multiplexer (ROADM) node with a Colorless, Directionless, and Contentionless (CDC) architecture, targeting smaller degree nodes, includes an integrated ROADM degree and add/drop module having M common input and output ports and N add/drop input and output ports, wherein the integrated ROADM degree and add/drop module is formed by an M×N demultiplexer Contentionless Wavelength Selective Switch (CWSS) and an M×N multiplexer CWSS; and X degree modules, each having an input and output port connected to common ports of the integrated ROADM degree and add/drop module, a first set of ports of the N add/drop input and output ports are connected for degree-to-degree connectivity and a second set of ports of the N add/drop input and output ports are utilized for local add/drop, such that the integrated module provides both the degree-to-degree connectivity and the local add/drop.

20 Claims, 7 Drawing Sheets

OPTIMIZED COLORLESS, DIRECTIONLESS, AND CONTENTIONLESS ROADM IN A MODULE

FIELD OF THE DISCLOSURE

The present disclosure generally relates to optical networking. More particularly, the present disclosure relates to systems and methods for an optimized Colorless, Directionless, and Contentionless (CDC) Reconfigurable Optical Add/Drop Multiplexer (ROADM) in an integrated module.

BACKGROUND OF THE DISCLOSURE

Optical networks utilize Reconfigurable Optical Add-Drop Multiplexers (ROADMs) to realize selective and reconfigurable add/drop of wavelengths or spectrum locally and between various degrees. ROADMs generally utilize Wavelength Selective Switches (WSSs) in different configurations. Flexibility in add/drop requirements has led to so-called colorless, directionless, and optionally contentionless add/drop multiplexer structures, such as in ROADM devices, nodes, architectures, and structures. A colorless add/drop device supports any wavelength or spectral occupancy/band being added to any port of an add/drop device, i.e., ports are not wavelength specific. A directionless add/drop device supports any port being directed to any degree. Finally, a contentionless add/drop device supports multiple instances of the same channel (wavelength) in the same device (albeit to different degrees). A colorless, directionless add/drop device can be referred to as a CD device, and a colorless, directionless, and contentionless add/drop device can be referred to as a CDC device.

CDC ROADM deployments are common and offer the most flexibility, albeit at higher costs and equipment requirements. Of note, conventional CDC configurations are less cost effective for smaller degree nodes. For this reason, network operators typically opt for CD or Colorless Direct Attach (CDA) configurations for smaller degree nodes (e.g., four or fewer degrees). It would be advantageous to provide a configuration which supports CDC in smaller degree and add/drop nodes with lower costs and equipment requirements.

BRIEF SUMMARY OF THE DISCLOSURE

In an embodiment, a Reconfigurable Optical Add/Drop Multiplexer (ROADM) node with a Colorless, Directionless, and Contentionless (CDC) architecture includes an integrated ROADM degree and add/drop module having M common input and output ports and N add/drop input and output ports, wherein the integrated ROADM degree and add/drop module is formed by an M×N demultiplexer Contentionless Wavelength Selective Switch (CWSS) and an M×N multiplexer CWSS, M and N are integers; and X degree modules, X is an integer and represents a number of degrees of the ROADM node, each having an input and output port connected to associated common ports of the integrated ROADM degree and add/drop module, wherein a first set of ports of the N add/drop input and output ports are connected between the demultiplexer CWSS and the multiplexer CWSS for degree-to-degree connectivity and a second set of ports of the N add/drop input and output ports are utilized for local add/drop of channels, such that the integrated ROADM degree and add/drop module provides both the degree-to-degree connectivity and the local add/drop of channels utilizing the demultiplexer CWSS and the multiplexer CWSS. X can be ≤4.

The first set of ports can be X*(X−1) input and output ports and the second set of ports can be N−X*(X−1) input and output ports. M−X input and output ports of the M common input and output ports can be unequipped. The first set of ports can include input and output ports for each degree to connect to every other degree. The demultiplexer CWSS and the multiplexer CWSS each can include M 1×N Wavelength Selective Switches (WSSs) each connected to one of M common ports; and N M×1 selector switches each connected to each of the M 1×N WSSs and connected to N add/drop ports. The M 1×N WSSs can be each formed using Liquid Crystal On Silicon (LCOS) and the N M×1 selector switches can be formed using Microelectromechanical systems (MEMS) mirrors or a Planar Lightwave Circuit (PLC). The X degree modules each can include a pre-amplifier, a post-amplifier, and an Optical Service Channel (OSC) module.

In another embodiment, an integrated Reconfigurable Optical Add/Drop Multiplexer (ROADM) degree and add/drop module with a Colorless, Directionless, and Contentionless (CDC) architecture includes M common input and output ports; and N add/drop input and output ports, an M×N demultiplexer Contentionless Wavelength Selective Switch (CWSS) and an M×N multiplexer CWSS, M and N are integers, configured to optically connect the M common input and output ports and the N add/drop input and output ports, wherein the integrated ROADM degree and add/drop module is utilized in an X degree ROADM node, X is an integer, and wherein a first set of ports of the N add/drop input and output ports are connected between the demultiplexer CWSS and the multiplexer CWSS for degree-to-degree connectivity and a second set of ports of the N add/drop input and output ports are utilized for local add/drop of channels, such that the integrated ROADM degree and add/drop module provides both the degree-to-degree connectivity and the local add/drop of channels utilizing the demultiplexer CWSS and the multiplexer CWSS. X can be ≤4.

The first set of ports can be X*(X−1) input and output ports and the second set of ports can be N−X*(X−1) input and output ports. M−X input and output ports of the M common input and output ports can be unequipped. The first set of ports can include input and output ports for each degree to connect to every other degree. The demultiplexer CWSS and the multiplexer CWSS each can include M 1×N Wavelength Selective Switches (WSSs) each connected to one of M common ports; and N M×1 selector switches each connected to each of the M 1×N WSSs and connected to N add/drop ports. The M 1×N WSSs can be each formed using Liquid Crystal On Silicon (LCOS) and the N M×1 selector switches can be formed using Microelectromechanical systems (MEMS) mirrors or a Planar Lightwave Circuit (PLC). Each of X of the M common input and output ports can be each connected to an associated degree module each including a pre-amplifier, a post-amplifier, and an Optical Service Channel (OSC) module.

In a further embodiment, a method includes providing an integrated Reconfigurable Optical Add/Drop Multiplexer (ROADM) degree and add/drop module with a Colorless, Directionless, and Contentionless (CDC) architecture, including M common input and output ports; and N add/drop input and output ports, an M×N demultiplexer Contentionless Wavelength Selective Switch (CWSS) and an M×N multiplexer CWSS, M and N are integers, configured to optically connect the M common input and output ports and the N add/drop input and output ports, wherein the integrated ROADM degree and add/drop module is utilized in an X degree ROADM node, X is an integer, and wherein a first set of ports of the N add/drop input and output ports are connected between the demultiplexer CWSS and the multiplexer CWSS for degree-to-degree connectivity and a second set of ports of the N add/drop input and output ports are utilized for local add/drop of channels, such that the integrated ROADM degree and add/drop module provides both the degree-to-degree connectivity and the local add/drop of channels utilizing the demultiplexer CWSS and the multiplexer CWSS. The method can further include providing X degree modules each having an input and output port connected to associated common ports of the integrated ROADM degree and add/drop module. X can be ≤4. The first set of ports can be X*(X−1) input and output ports and the second set of ports can be N−X*(X−1) input and output ports.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various embodiments, the present disclosure relates to an optimized Colorless, Directionless, and Contentionless (CDC) Reconfigurable Optical Add/Drop Multiplexer (ROADM) in an integrated module. Specifically, the proposed CDC ROADM described herein provides a small CDC architecture within a single module, e.g., supporting a four degree or less ROADM node. Variously, the CDC architecture proposed herein utilizes a same Wavelength Selective Switch (WSS) module for both degree connectivity and for local add/drop, enabling a single module to support a cost-reduced CDC ROADM. Thus, the switching elements of a CDC architecture is self-contained in the single module, providing cost reduction, less equipment, reduced power consumption, etc. versus a conventional, multi-module CDC architecture. The CDC architecture proposed herein is ideal for smaller degree nodes.

Conventional CDC ROADM Architecture

Figure 1:
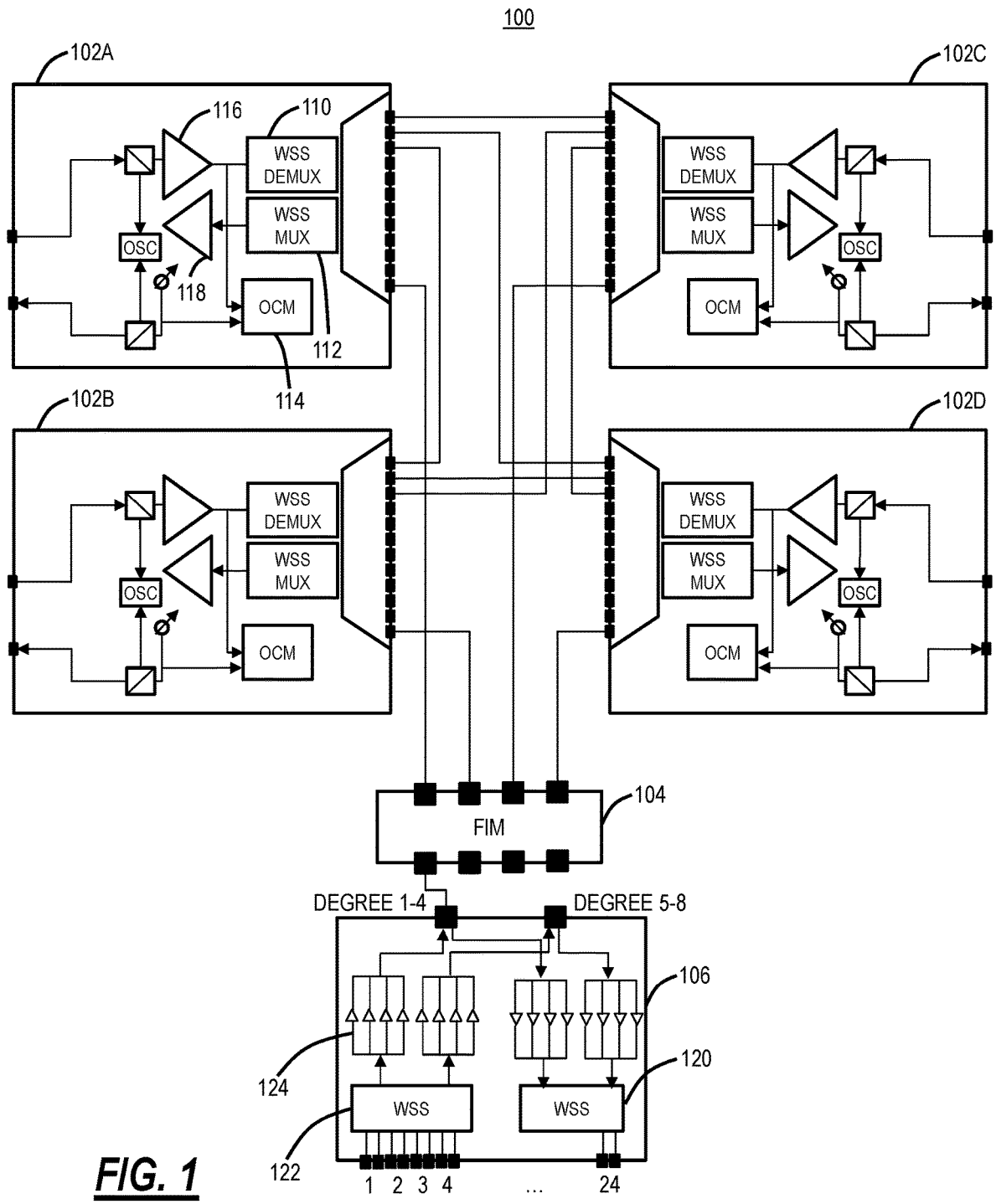
FIG. 1 is a block diagram of an example four degree ROADM node utilizing multiple modules to form the degrees and the local add/drop.

FIG. 1 is a block diagram of an example four degree ROADM node 100 utilizing multiple modules 102, 104, 106 to form the degrees and the local add/drop. Specifically, the ROADM node 100 includes four-degree modules 102A, 102B, 102C, 102D, a Fiber Interface Module (FIM) 104 for managing fiber connectivity between the modules 102, 106, and a local add/drop module 106. The degree modules 102A, 102B, 102C, 102D each include a Wavelength Selective Switch (WSS) demultiplexer 110, a WSS multiplexer 112, pre-amplifier 116, a post-amplifier 118, and an Optical Channel Monitor (OCM) 114. The degree modules 102A, 102B, 102C, 102D can further include an Optical Service Channel (OSC), and other components. The FIM module 104 can be a passive device which provides optical fiber connectivity between the degree modules 102A, 102B, 102C, 102D, between the degree modules 102A, 102B, 102C, 102D and the local add/drop module 106. The local add/drop module 106 provides connectivity to local optical transceivers, modems, etc. to the degrees via the degree modules 102A, 102B, 102C, 102D. The local add/drop module 106 includes a WSS 120 for channel adds, a WSS 122 for channel drops, and amplifiers 124 (which can be optional).

The four-degree ROADM node 100 includes a CDC architecture which is flexible, operationally simple, and future-proof. Any wavelength can be added/dropped or expressed through any degree, through software configuration. However, the CDC architecture illustrated in the four degree ROADM node 100 has significant cost, required equipment, and power consumption. Specifically, the four-degree ROADM node 100 has eight WSS modules 110, 112 and two WSS modules 120, 122 for a total of 10 WSS modules.

Optimized CDC ROADM Architecture

Figure 2:
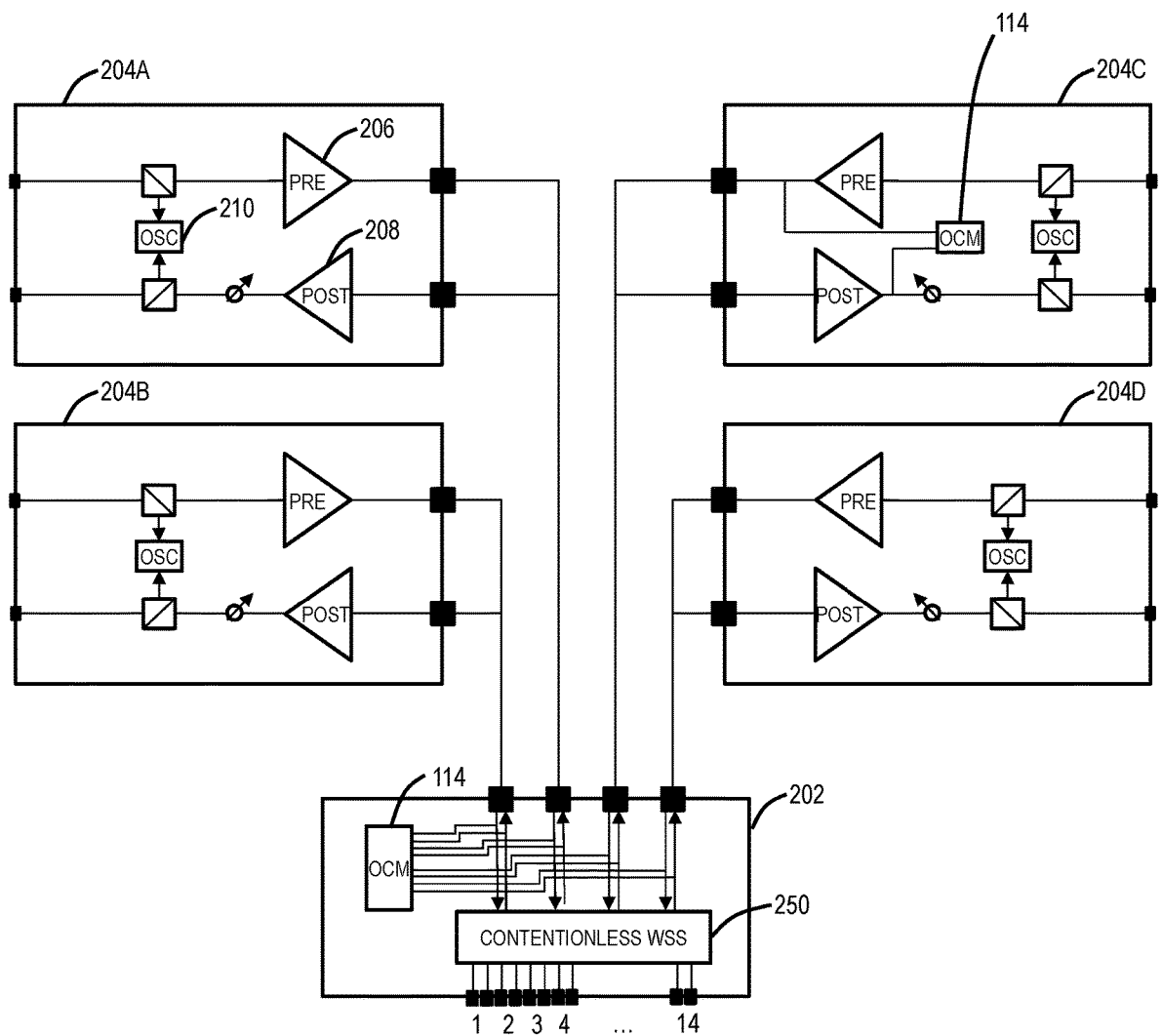
FIG. 2 is a block diagram of an optimized ROADM node utilizing a single module to form the degrees and the local add/drop.

Accordingly, embodiments are presented directed to an optimized CDC ROADM architecture which reduces the equipment, footprint, and cost/power associated with the four degree ROADM node 100. FIG. 2 is a block diagram of an optimized ROADM node 200 utilizing a single module 202 to form the degrees and the local add/drop degrees and local add/drop switching. Specifically, the optimized ROADM node 200 provides the same CDC architecture as the four-degree ROADM node 100 albeit with reduced equipment. The optimized ROADM node 200 includes a ROADM degree and add/drop module 202 which is a single module providing WSS functionality for both degree-to-degree connectivity and for local add/drop. The ROADM degree and add/drop module 202 provides the degree functionality of the degree modules 102A, 102B, 102C, 102D. Instead, the optimized ROADM node 200 includes amplifier modules 204A, 204B, 204C, 204D instead of the degree modules 102A, 102B, 102C, 102D. The amplifier module 204 includes a pre-amplifier 206, a post-amplifier 208, and an OSC 210. Note, the amplifier modules 204 do not require WSS components as the degree modules 102 include. Accordingly, the amplifier modules 204 have reduced cost, space, and power relative to the degree modules 102.

Note, the four-degree ROADM node 100 and the optimized ROADM node 200 are both shown with four degrees for illustration purposes. As described herein, the four-degree ROADM node 100 has a total of 10 WSS modules whereas the optimized ROADM node 200 requires only 2 WSS modules, namely a contentionless WSS 250 (one for the multiplexer and one for the demultiplexer). Those of ordinary skill in the art will recognize the single module 202 can be used to form other nodal architectures, i.e., one, two, three-degrees. Also, the single module 202 can be used to form larger degrees, i.e., five or more, at the expense of a reduction in local add/drop. The proposed solution advantageously enables implementation of smaller degree nodes with a CDC approach.

The four-degree ROADM node 100 can also include the OCM 114 to provide monitoring functionality. In an embodiment, the OCM 114 can be integrated in the single module 202. In another embodiment, the OCM 114 can be in each of the amplifier modules 204A, 204B, 204C, 204D.

Contentionless WSS

Figure 3:
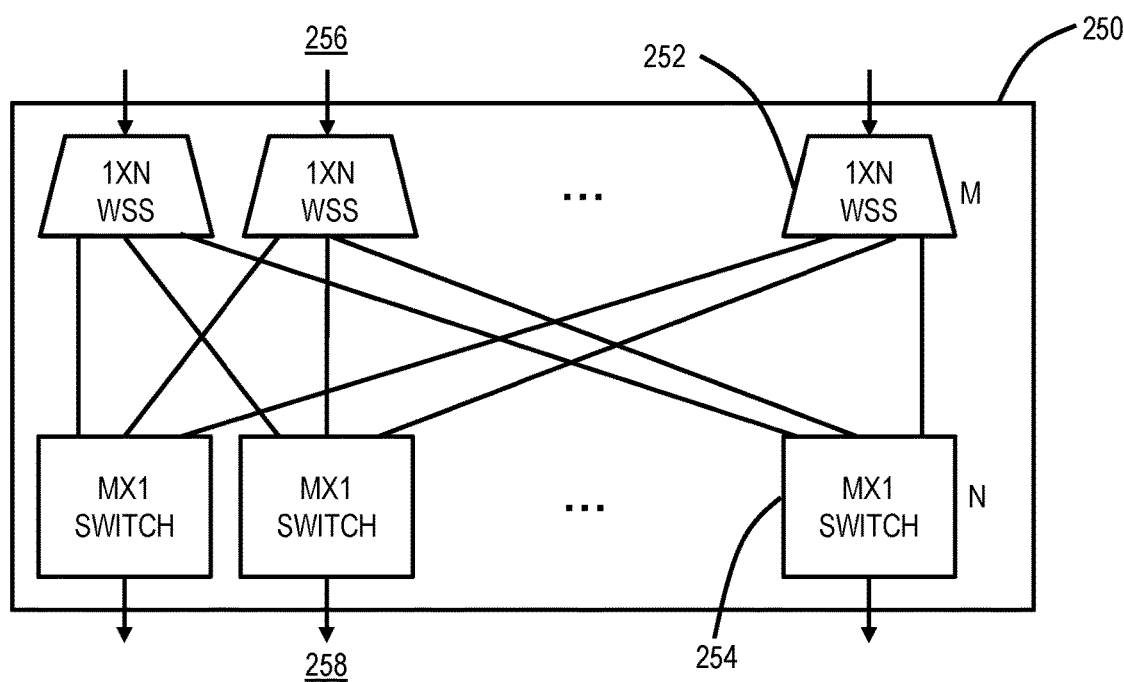
FIG. 3 is a block diagram of a contentionless WSS utilized in the optimized ROADM node.

FIG. 3 is a block diagram of a contentionless WSS (CWSS) 250 utilized in the optimized ROADM node 200. The CWSS 250 is utilized to realize the CDC architecture. Previously, the CDC architecture was formed through Multicast Switches (MCS). Advantageously, the CWSS 250 has, relative to the MCS implementation of a CDC architecture, a significantly lower loss, the potential to scale to higher port counts, and channel filtering is built-in in the multiplexing direction to reduce noise funneling. The systems and methods herein utilize the CWSS 250 to realize the CDC architecture in the optimized ROADM node 200. An example of the CWSS 250 is described in Colbourne, P. D., McLaughlin, S., Murley, C., Gaudet, S., & Burke, D. (2018, March), "Contentionless Twin 8×24 WSS with Low Insertion Loss," in *Optical Fiber Communication Conference* (pp. Th4A-1), Optical Society of America, the contents of which are incorporated by reference herein.

The CWSS 250 includes an M-array of 1×N WSSs 252 and an N-array of M×1 selector switches 254. The CWSS 250 requires two switching elements, namely the M-array of 1×N WSS 252 and the N-array of M×1 selector switches 254 (whereas the MCS has a single switching element with combiners/splitters). Thus, the CWSS 250 can be referred to as an M×N device (M, N are integers, such as 8×24, etc.).

The M ports connected to the 1×N WSSs 252 can be referred to as common ports 256 of the CWSS 250 and each is connected to a fully independent 1×N WSS 252, enabling individual wavelengths to be routed independently to any of N Add/Drop ports 258 connected to the M×1 selector switches 254. Each of the N Add/Drop ports 258 can be coupled to any common port 256 of the CWSS 250 via the bank of M×1 selector switches 254. Note that each add/drop port 258 can be connected to only one common port 256 at one time (there is no wavelength selectivity in the M×1 selector switches 254). The function is similar to a multicast switch, but with 1×N splitters replaced by 1×N WSS's. Up to M instances of a given wavelength can be routed independently through the M×N CWSS 250 without contention.

In an embodiment, the CWSS 250 can be 8×24 (M=8, N=24) and the 1×24 WSS's 252 can be implemented using Liquid Crystal On Silicon (LCOS) phase modulator beam steering. One LCOS panel can be sub-divided into several independent sections, to control multiple independent WSS's within the same device, plus the LCOS steering engine enables flexible spectrum operation with variable channel widths. To minimize insertion loss, the 8×1 selector switches 254 can be implemented using an array of Microelectromechanical systems (MEMS) mirrors (a Planar Lightwave Circuit (PLC) design also possible). An advantage of MEMS mirrors as the switch elements is high isolation, thus preventing same-wavelength signals from different common ports 256 from causing interference.

The foregoing description utilizes the CWSS 250 as an 8×26 device (M=8, N=26) for describing the implementation of the ROADM degree and add/drop module 202. Those of ordinary skill in the art will recognize that different values of M and N are contemplated.

Single ROADM Degree and Add/Drop Module

Figure 4:
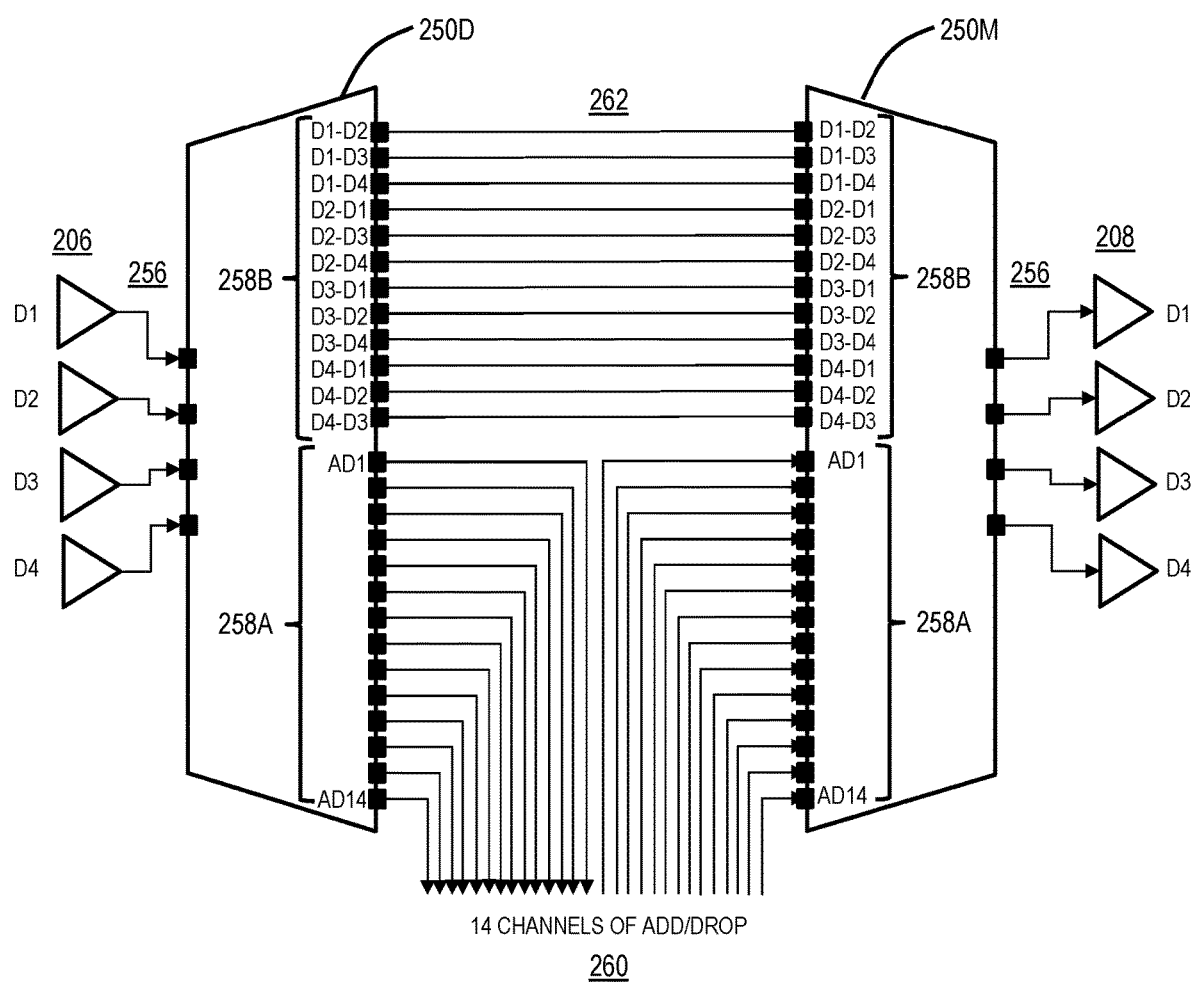
FIG. 4 is a block diagram of nodal connectivity associated with the ROADM degree and add/drop module and two Contentionless Wavelength Selective Switches (CWSSs) in the optimized ROADM node of FIG. 2.
Figure 5:
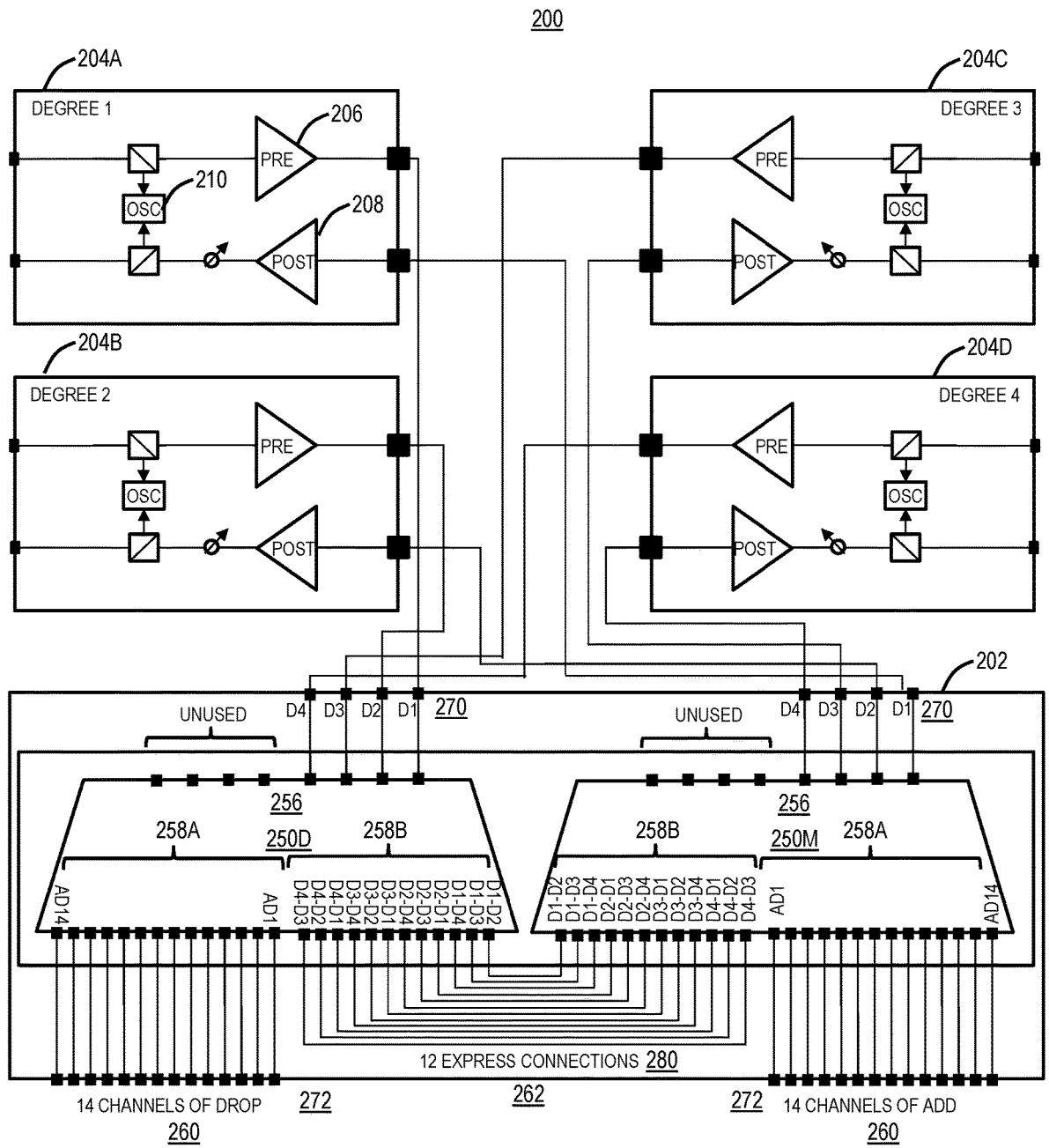
FIG. 5 is a block diagram of module connectivity between the ROADM degree and add/drop module and the amplifier modules in the optimized ROADM node of FIG. 2.

FIG. 4 is a block diagram of nodal connectivity associated with the ROADM degree and add/drop module 202 and two CWSSs 250 in the optimized ROADM node 200. FIG. 5 is a block diagram of module connectivity between the ROADM degree and add/drop module 202 and the amplifier modules 204A, 204B, 204C, 204D in the optimized ROADM node 200. Again, for illustration purposes, FIGS. 4 and 5 illustrate a four-degree configuration and other degree configurations are also contemplated.

The present disclosure contemplates a single ROADM degree and add/drop module 202 which performs the degree connectivity and the local add/drop connectivity in a single, integrated module. The ROADM degree and add/drop module 202 provides the functionality of the local add/drop module 106 and the WSS demultiplexer 110 and the WSS multiplexer 112 in the degree modules 102.

The single ROADM degree and add/drop module 202 includes two CWSS 250 modules which are denoted as CWSS 250D for a demultiplexer WSS and CWSS 250M for a multiplexer WSS, i.e., the single ROADM degree and add/drop module 202 contains both the multiplexer and demultiplexer WSS functions. In an embodiment, the CWSS 250D, 250M can be a twin contentionless 8×26 WSS module. The CWSS 250D, 250M is generally designed to act as CDC multiplexer/demultiplexer when used in combination with a high port count twin WSS on the line side (such as the WSSs 120, 122 in FIG. 1). However, through remapped internal connectivity, the CWSSs 250D, 250M are also repurposed to provide a multi-degree CDC ROADM along with the add/drop functionality.

FIG. 4 illustrates logical connectivity using the single ROADM degree and add/drop module 202 to provide a four degree CDC architecture and to locally add/drop 14 channels. The optimized ROADM node 200 includes four degrees, labeled D1, D2, D3, D4. FIG. 4 is illustrated logically from right to left with the right side showing node ingress via four pre-amplifiers 206, one for each degree D1, D2, D3, D4, and each input into an associated common port 256 of the CWSS 250D.

The CWSS 250D has ports 258, which are denoted as add/drop ports 258A and express ports 258B. The add/drop ports 258A are used for local add/drop 260 and the express ports 258B are used for degree-to-degree connectivity 262. On the CWSS 250D, the add/drop ports 258A are used for dropping channels from the degrees D1, D2, D3, D4. The express ports 258B on the CWSS 250D connect to respective express ports 258B on the CWSS 250M. For example, a degree D1-D2 express port 258B on the CWSS 250D connects to a corresponding degree D1-D2 express port 258B on the CWSS 250M, and the like. The CWSS 250M also has add/drop ports 258A used for local add/drop 260. On the CWSS 250M, the add/drop ports 258A are used for adding channels locally to the degrees D1, D2, D3, D4.

Of note, an aspect of the proposed solution is the unique connectivity between the express ports 258B on the CWSS 250D and the express ports 258B on the CWSS 250M for the degree-to-degree connectivity. Because the CWSS 250D, 250M uses MEMS for the add/drop ports 258, e.g., the M×1 selector switches 254, the CWSS 250D, 250M can only route spectrum from/to a specific degree. As such, it is not possible to simply connect the multiplexer and demultiplexer halves of a module and route traffic arbitrarily between degrees.

Figure 6:
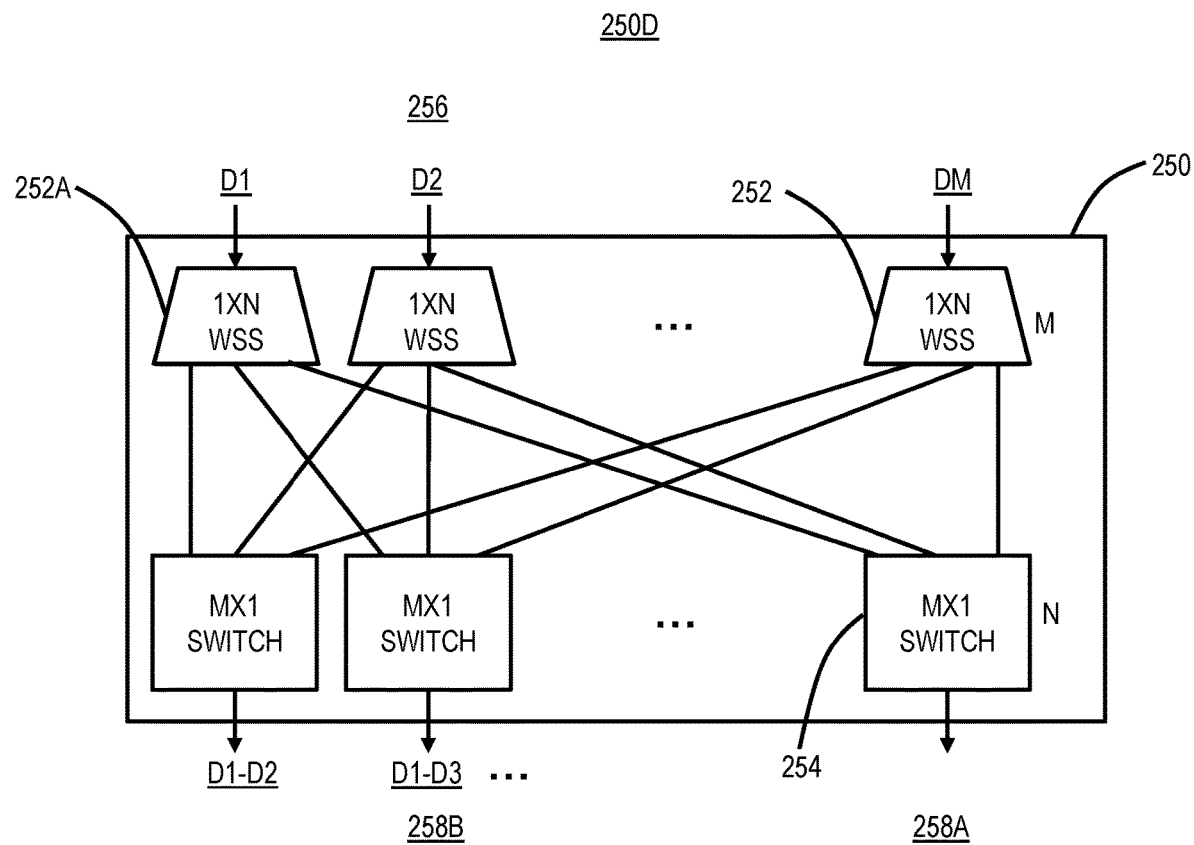
FIG. 6 is a block diagram of a CWSS on a demultiplexer side illustrating degree routing.

For example, traffic incident on degree D1 has spectrum that needs to be routed to degrees D2, D3, D4. Since the input to the CWSS 250M module has a MEMs switch which selects a given degree (stripe of LCOS), it is not possible to send all the express traffic to one port. Express traffic from degree D1 needs to be routable to an input dedicated to degree D2, D3, D4. FIG. 6 is a block diagram of the CWSS 250D illustrating degree routing. Here, degree D1 is input to a 1×N WSS 252A which steers light towards a given output port's MEMs switch. As such, the express ports 258B require a port for each degree, namely D1-D2, D1-D3, etc.

For X degrees, X being an integer, the configuration of the CWSS 250D, 250M requires X*(X−1) ports to route express traffic. Thus, for four degrees, the optimized ROADM node 200 requires 4*(4−1)=12 port connections between the CWSS 250D and the CWSS 250M halves of the module.

Assume the CWSS 250D, 250M are M×N devices (M, N are integers, typically M<N, but not required) and there are X degrees, X is an integer (X must be less than or equal to M), the following provides the port numbers available for local add/drop.

Number of the express ports 258B required for degree-to-degree connectivity 262=X*(X−1).

The M common ports 256 on each of the CWSS 250D, 250M are connected to the X degrees, and if M>X, these ports are unequipped.

Number of the express ports 258B for the local add/drop 260=N−X*(X−1).

Assume the CWSS 250D, 250M are 8×26 (M=8, N=26), the following table illustrates capabilities for a different number of degrees (these numbers apply to one of the CWSS 250D, 250M):

TABLE 1

Example port counts for different degrees and an 8 × 26 CWSS

| Number of Degrees | Common ports 256 | Add/drop ports 258 |
|---|---|---|
| 2 | 2 equipped; 6 unequipped | 2 for degree-to-degree connectivity 262; 24 for local add/drop 260 |
| 3 | 3 equipped; 5 unequipped | 6 for degree-to-degree connectivity 262; 20 for local add/drop 260 |
| 4 | 4 equipped; 4 unequipped | 12 for degree-to-degree connectivity 262; 14 for local add/drop 260 |
| 5 | 5 equipped; 3 unequipped | 20 for degree-to-degree connectivity 262; 6 for local add/drop 260 |

As seen in Table 1, the CWSS 250D, 250M in the optimized ROADM node 200 provide reasonable add/drop counts for degrees four and lower, at the expense of unused/unequipped common ports and at a significantly lower cost, power, and footprint relative to the CDC architecture of the four-degree ROADM node 100.

Of course, other values of M×N are contemplated. For example, it is expected that N will increase, e.g., 26 to 40, etc. This would enable more degrees, e.g., an 8×40 CWSS 250D, 250M would enable the 5 degrees with 20 local add/drop 260. Thus, when N is larger, it may be possible to deploy the optimized ROADM node 200 at higher degree nodes (e.g., 5 or more). In this manner, the optimized ROADM node 200 may support the CDC architecture at all nodes in a network.

FIG. 5 illustrates a module configuration for realizing the optimized ROADM node 200 using the CWSS 250D, 250M. Of note, FIG. 5 has the same functionality as FIG. 1 albeit with less equipment and the ROADM degree and add/drop module 202 for providing both local add/drop 260 and degree-to-degree connectivity 262. From a hardware perspective, the ROADM degree and add/drop module 202 can be a rack-mountable module (e.g., 1-2 Rack Units (RU) high) or circuit pack inserted into a shelf with 2M common ports 270 and 2N add/drop ports 272. The ports 270, 272 are optical ports configured for an optical fiber, patch cord, etc. The ROADM degree and add/drop module 202 includes both the CWSS 250D, 250M and thus has 2M common ports 270 and 2N add/drop ports 272.

In this example, four degrees and 8×26 CWSS 250D, 250M, the 2M common ports 270 include 8 ports on the CWSS 250D and 8 ports on the CWSS 250M, four of which on each are unused/unequipped as described herein. The 2N add/drop ports 272 includes 14 local add/drop 260 channels on each of the CWSS 250D, 250M and 12 express connections between the express ports 258B for the degree-to-degree connectivity 262. In an embodiment, express connections 280 can be internally connected inside the ROADM degree and add/drop module 202 (as illustrated in FIG. 5). In another embodiment, the express ports 258B can also have faceplate ports on the ROADM degree and add/drop module 202 and the express connections 280 can be formed by cabling between the faceplate ports.

Note, each of the CWSS 250D, 250M is M×N, so the overall ROADM degree and add/drop module 202 can have 2M common ports and 2N add/drop ports on the faceplate, i.e., each port can connect to one optical fiber and a channel can be an input and an output port. Additionally, the term port used herein can refer to two physical connections on the ROADM degree and add/drop module 202. For example, an input and output port physically has two connections—one each for input and output. For example, the CWSS 250D, 250M are deployed in a so-called twin module. The express connections 280 can be ports of each of the twin connected to one another.

ROADM Node with an Optimized CDC Architecture

In an embodiment, a ROADM node with an optimized CDC architecture includes an integrated ROADM degree and add/drop module 202 having M common input and output ports 270 and N add/drop input and output ports 272, wherein the integrated ROADM degree and add/drop module 202 is formed by an M×N demultiplexer Contentionless Wavelength Selective Switch (CWSS) 250D and an M×N multiplexer CWSS 250M, M and N are integers; and X degree modules 204, X is an integer and represents a number of degrees of the ROADM node, each having an input and output port connected to associated common ports 270 of the integrated ROADM degree and add/drop module 202, wherein a first set of ports 258B of the N add/drop input and output ports 272 are connected between the demultiplexer CWSS 250D and the multiplexer CWSS 250M for degree-to-degree connectivity 262 and a second set of ports 258A of the N add/drop input and output ports 272 are utilized for local add/drop 260 of channels, such that the integrated ROADM degree and add/drop module 202 provides both the degree-to-degree connectivity 262 and the local add/drop 260 of channels utilizing the demultiplexer CWSS 250D and the multiplexer CWSS 250M. Optionally, the number of degrees is X≤4.

The first set of ports 258B is X*(X−1) input and output ports and the second set of ports 258A is N−X*(X−1) input and output ports. M−X input and output ports of the M common input and output ports 270 are unequipped. The first set of ports 258B include input and output ports for each degree to connect to every other degree. The demultiplexer CWSS 250D and the multiplexer CWSS 250M each include M 1×N Wavelength Selective Switches (WSSs) 252 each connected to one of M common ports 256; and N M×1 selector switches 254 each connected to each of the M 1×N WSSs 252 and connected to N add/drop ports 258. The M 1×N WSSs 252 are each formed using Liquid Crystal On Silicon (LCOS) and the N M×1 selector switches 254 are formed using Microelectromechanical systems (MEMS) mirrors. The X degree modules 204 each can include a pre-amplifier 206, a post-amplifier 208, and an Optical Service Channel (OSC) module 210.

In another embodiment, an integrated ROADM degree and add/drop module 202 with an optimized CDC architecture includes M common input and output ports 270; and N add/drop input and output ports 272, an M×N demultiplexer Contentionless Wavelength Selective Switch (CWSS) 250D and an M×N multiplexer CWSS 250M, M and N are integers, configured to optically connect the M common input and output ports 270 and the N add/drop input and output ports 272, wherein the integrated ROADM degree and add/drop module 202 is utilized in an X degree ROADM node, X is an integer, and wherein a first set of ports 258B of the N add/drop input and output ports 272 are connected between the demultiplexer CWSS 250D and the multiplexer CWSS 250M for degree-to-degree connectivity 262 and a second set of ports 258A of the N add/drop input and output ports 272 are utilized for local add/drop 260 of channels, such that the integrated ROADM degree and add/drop module 202 provides both the degree-to-degree connectivity 262 and the local add/drop 260 of channels utilizing the demultiplexer CWSS 250D and the multiplexer CWSS 250M.

Redundant Configuration

Figure 7:
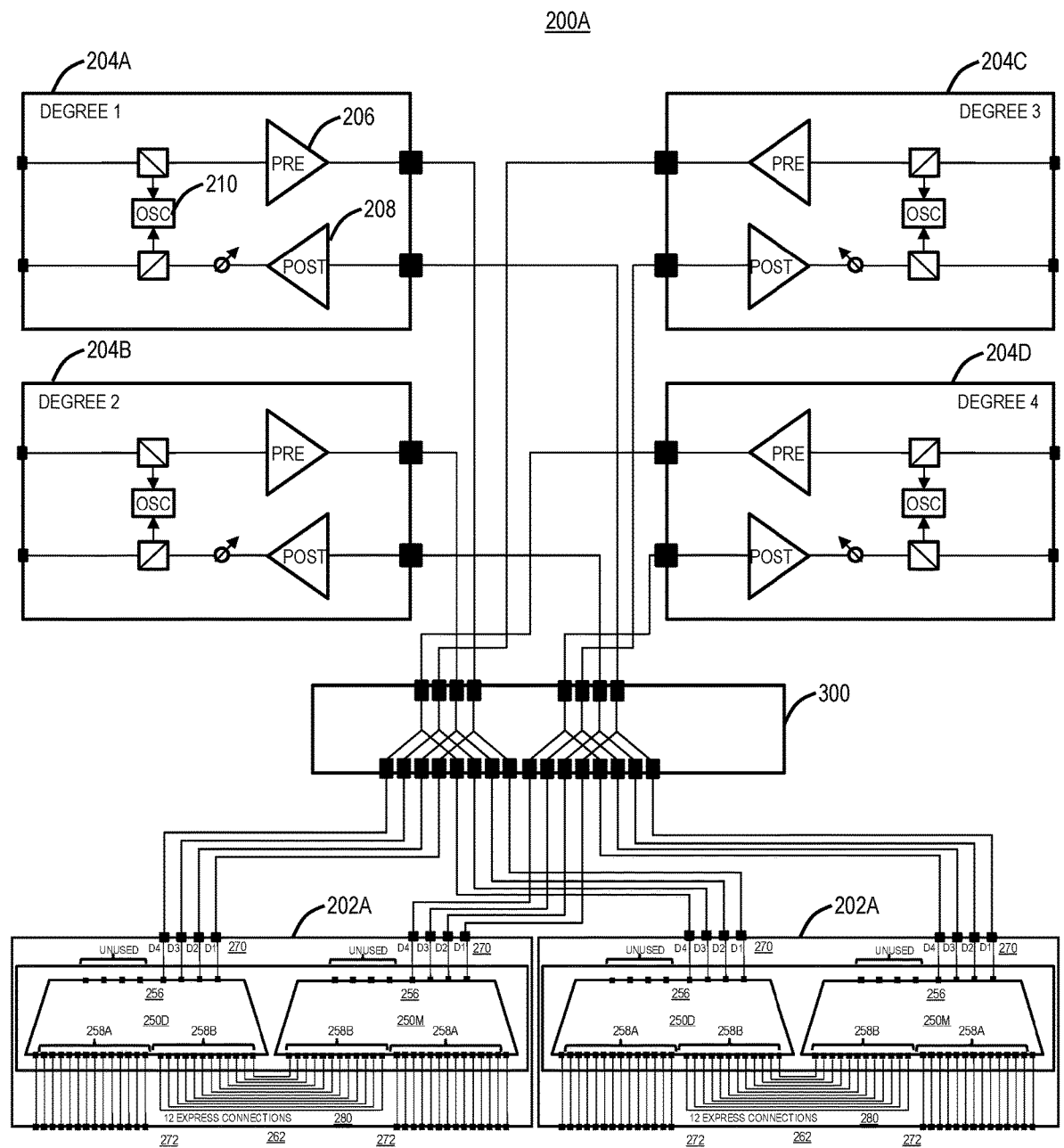
FIG. 7 is a block diagram of module connectivity in an optimized ROAM node which includes two ROADM degree and add/drop modules for redundancy and/or increased port count.

FIG. 7 is a block diagram of module connectivity in an optimized ROAM node 200A which includes two ROADM degree and add/drop modules 202A, 202B for redundancy and/or increased port count. The optimized ROAM node 200A in FIG. 7 is similar to the optimized ROAM node 200 in FIG. 5 with four amplifier modules 204A, 204B, 204C, 204D. Again, for illustration purposes, FIG. 7 illustrates a four-degree configuration and other degree configurations are also contemplated. The optimized ROAM node 200A includes two of the ROADM degree and add/drop modules 202A, 202B along with a splitter 300 located between the ROADM degree and add/drop modules 202A, 202B and the amplifier modules 204A, 204B, 204C, 204D. The splitter 300 is a passive splitter array in both the transmit and the receive direction.

Functionally, the optimized ROAM node 200A provides redundancy, namely the ROADM degree and add/drop modules 202 is not a single point of failure. However, the optimized ROAM node 200A can also support 2X the port count due to the presence of two ROADM degree and add/drop modules 202A, 202B. For example, the optimized ROAM node 200A can support additional local add/drop ports.

On the add/drop ports 272, there can be a second transceiver for 1+1/1:1/etc. protection or an Optical Protection Switch (OPS) which only utilizes a single transceiver. With the optimized ROAM node 200A for redundancy, there is protection against a complete node failure in the event a single ROADM degree and add/drop module 202 fails. Also, the optimized ROAM node 200A can also provide express redundancy, software could detect a failed ROADM degree and add/drop module 202A and route the express traffic via the second ROADM degree and add/drop module 202B.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A Reconfigurable Optical Add/Drop Multiplexer (ROADM) node with a Colorless, Directionless, and Contentionless (CDC) architecture, the ROADM node comprising:
   an integrated ROADM degree and add/drop module having M common input and output ports and N add/drop input and output ports, wherein the integrated ROADM degree and add/drop module is formed by an M×N demultiplexer Contentionless Wavelength Selective Switch (CWSS) and an M×N multiplexer CWSS, M and N are integers; and
   X degree modules, X is an integer and represents a number of degrees of the ROADM node, each having an input and output port connected to associated common ports of the integrated ROADM degree and add/drop module, wherein a first set of ports of the N add/drop input and output ports are connected between the demultiplexer CWSS and the multiplexer CWSS for degree-to-degree connectivity and a second set of ports of the N add/drop input and output ports are utilized for local add/drop of channels, such that the integrated ROADM degree and add/drop module provides both the degree-to-degree connectivity and the local add/drop of channels utilizing the demultiplexer CWSS and the multiplexer CWSS, and wherein the first set of ports is $X*(X-1)$ input and output ports and the second set of ports is $N-X*(X-1)$ input and output ports.

2. The ROADM node of claim 1, wherein $X \leq 4$.

3. The ROADM node of claim 1, wherein M−X input and output ports of the M common input and output ports are unequipped.

4. The ROADM node of claim 1, wherein the first set of ports comprise input and output ports for each degree to connect to every other degree.

5. The ROADM node of claim 1, wherein the demultiplexer CWSS and the multiplexer CWSS each comprise:
M 1×N Wavelength Selective Switches (WSSs) each connected to one of M common ports; and
N M×1 selector switches each connected to each of the M 1×N WSSs and connected to N add/drop ports.

6. The ROADM node of claim 5, wherein the M 1×N WSSs are each formed using Liquid Crystal On Silicon (LCOS) and the N M×1 selector switches are formed using Microelectromechanical systems (MEMS) mirrors or a Planar Lightwave Circuit (PLC).

7. The ROADM node of claim 1, wherein the X degree modules each comprise a pre-amplifier, a post-amplifier, and an Optical Service Channel (OSC) module.

8. An integrated Reconfigurable Optical Add/Drop Multiplexer (ROADM) degree and add/drop module with a Colorless, Directionless, and Contentionless (CDC) architecture, comprising:
M common input and output ports; and
N add/drop input and output ports, an M×N demultiplexer Contentionless Wavelength Selective Switch (CWSS) and an M×N multiplexer CWSS, M and N are integers, configured to optically connect the M common input and output ports and the N add/drop input and output ports,
wherein the integrated ROADM degree and add/drop module is utilized in an X degree ROADM node, X is an integer,
wherein a first set of ports of the N add/drop input and output ports are connected between the demultiplexer CWSS and the multiplexer CWSS for degree-to-degree connectivity and a second set of ports of the N add/drop input and output ports are utilized for local add/drop of channels, such that the integrated ROADM degree and add/drop module provides both the degree-to-degree connectivity and the local add/drop of channels utilizing the demultiplexer CWSS and the multiplexer CWSS, and
wherein the first set of ports is $X*(X-1)$ input and output ports and the second set of ports is $N-X*(X-1)$ input and output ports.

9. The integrated ROADM degree and add/drop module of claim 8, wherein $X \leq 4$.

10. The integrated ROADM degree and add/drop module of claim 8, wherein M−X input and output ports of the M common input and output ports are unequipped.

11. The integrated ROADM degree and add/drop module of claim 8, wherein
the first set of ports comprise input and output ports for each degree to connect to every other degree.

12. The integrated ROADM degree and add/drop module of claim 8, wherein the demultiplexer CWSS and the multiplexer CWSS each comprise:
M 1×N Wavelength Selective Switches (WSSs) each connected to one of M common ports; and
N M×1 selector switches each connected to each of the M 1×N WSSs and connected to N add/drop ports.

13. The integrated ROADM degree and add/drop module of claim 12, wherein the M 1×N WSSs are each formed using Liquid Crystal On Silicon (LCOS) and the N M×1 selector switches are formed using Microelectromechanical systems (MEMS) mirrors or a Planar Lightwave Circuit (PLC).

14. The integrated ROADM degree and add/drop module of claim 8, wherein each of X of the M common input and output ports are each connected to an associated degree module each comprising a pre-amplifier, a post-amplifier, and an Optical Service Channel (OSC) module.

15. An integrated Reconfigurable Optical Add/Drop Multiplexer (ROADM) degree and add/drop module with a Colorless, Directionless, and Contentionless (CDC) architecture, comprising:
M common input and output ports; and
N add/drop input and output ports, an M×N demultiplexer Contentionless Wavelength Selective Switch (CWSS) and an M×N multiplexer CWSS, M and N are integers, configured to optically connect the M common input and output ports and the N add/drop input and output ports,
wherein the integrated ROADM degree and add/drop module is utilized in an X degree ROADM node, X is an integer,
wherein a first set of ports of the N add/drop input and output ports are connected between the demultiplexer CWSS and the multiplexer CWSS for degree-to-degree connectivity and a second set of ports of the N add/drop input and output ports are utilized for local add/drop of channels, such that the integrated ROADM degree and add/drop module provides both the degree-to-degree connectivity and the local add/drop of channels utilizing the demultiplexer CWSS and the multiplexer CWSS, and,
wherein the demultiplexer CWSS and the multiplexer CWSS each include M 1×N Wavelength Selective Switches (WSSs) each connected to one of M common ports, and N M×1 selector switches each connected to each of the M 1×N WSSs and connected to N add/drop ports.

16. The integrated ROADM degree and add/drop module of claim 15, wherein $X \leq 4$.

17. The integrated ROADM degree and add/drop module of claim 15, wherein M−X input and output ports of the M common input and output ports are unequipped.

18. The integrated ROADM degree and add/drop module of claim 15, wherein the first set of ports comprise input and output ports for each degree to connect to every other degree.

19. The integrated ROADM degree and add/drop module of claim 15, wherein the M 1×N WSSs are each formed using Liquid Crystal On Silicon (LCOS) and the N M×1 selector switches are formed using Microelectromechanical systems (MEMS) mirrors or a Planar Lightwave Circuit (PLC).

20. The integrated ROADM degree and add/drop module of claim 15, wherein each of X of the M common input and output ports are each connected to an associated degree module each comprising a pre-amplifier, a post-amplifier, and an Optical Service Channel (OSC) module.

\* \* \* \* \*